Aug. 21, 1928.
J. W. SAWYER
1,681,627
PROCESS AND APPARATUS FOR CLEANING BERRIES
Original Filed Dec. 15, 1922     2 Sheets-Sheet 1
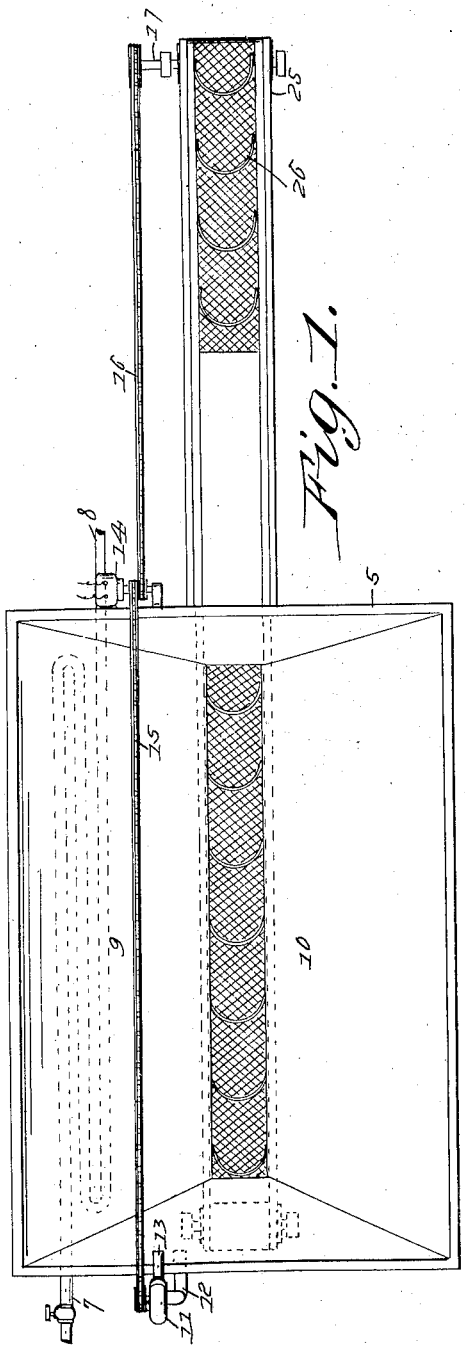
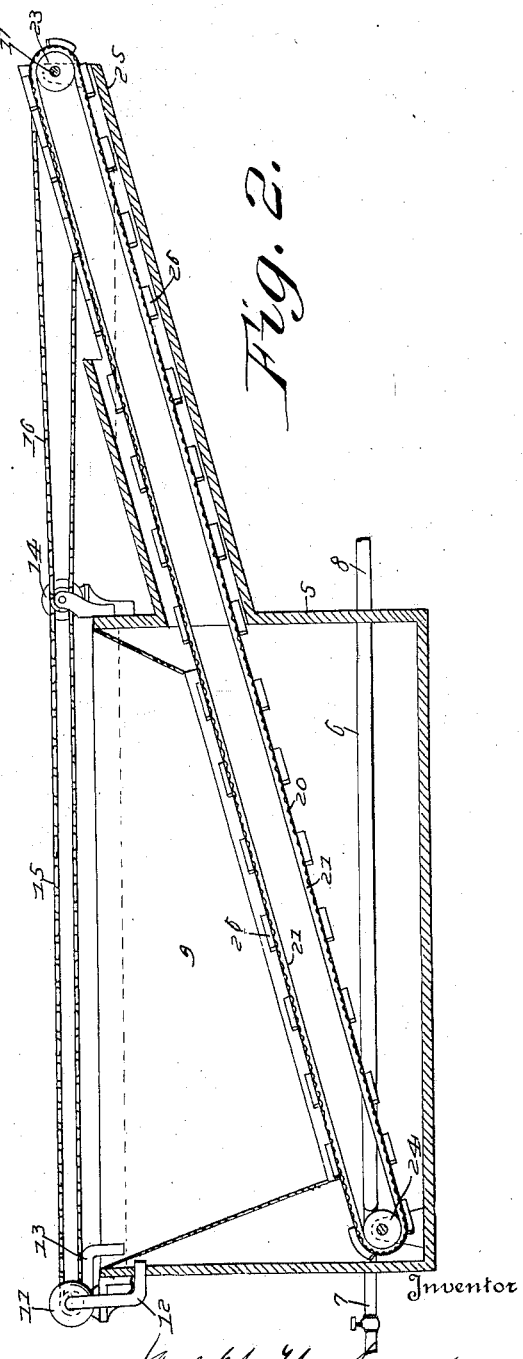

Aug. 21, 1928.
J. W. SAWYER
1,681,627
PROCESS AND APPARATUS FOR CLEANING BERRIES
Original Filed Dec. 15, 1922    2 Sheets-Sheet 2
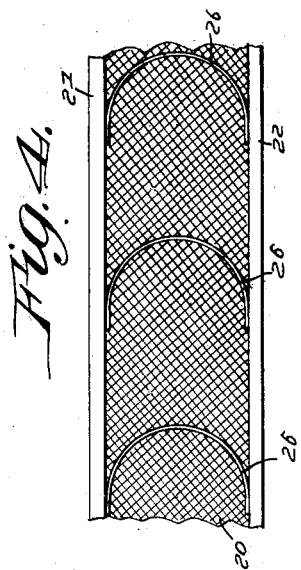
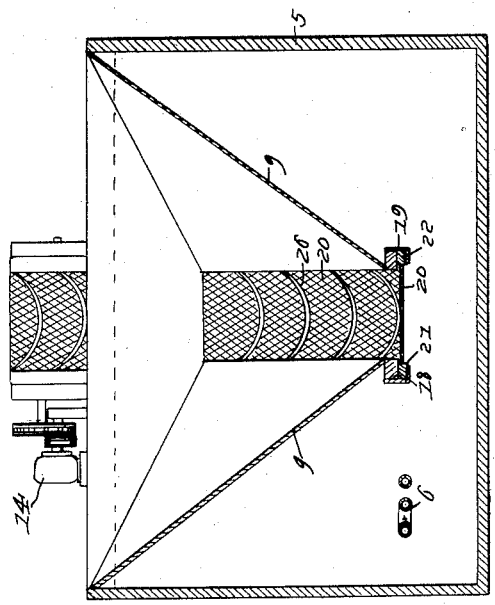
Inventor
Joseph W. Sawyer
By
Attorney Patented Aug. 21, 1928.

1,681,627

UNITED STATES PATENT OFFICE.

JOSEPH W. SAWYER, OF MILLBRIDGE, MAINE.

PROCESS AND APPARATUS FOR CLEANING BERRIES.

Application filed December 15, 1922, Serial No. 607,211. Renewed March 19, 1927.

This invention relates to a method of and means for separating fruit such as berries, and particularly to a machine adapted for use in separating ripe berries from those that are unripe and imperfect and also from leaves, twigs, insects or the like which may be present with the berries after being picked.

It is a primary object of this invention to produce a machine capable of separating ripe and perfect blueberries from the unripe and imperfect ones, as well as from such trash as leaves, twigs, insects and the like as stated, and to that end, a conveyer is associated with a settling tank, and preferably, the settling tank is provided with means for maintaining the water at a temperature above its normal temperature, as it has been found that blueberries will settle faster in water that is at a higher temperature than the normal temperature of water.

The theory advanced for the improved results, due to the presence of water of higher temperature in the tank, is that the air bubbles on the berry do not adhere to the berry so tenaciously in hot water or partially heated water as they do in water having its natural temperature, and while the inventor does not wish to be limited with respect to the temperature of the water, effective results have been attained when the same was at about 115° F. Water heated to other degrees could be used to some extent, the temperature depending upon the condition of the berries being treated so that latitude must be afforded, it will be apparent.

A still further object of this invention is to produce a device which may be mechanically operated for removing the berries that settle in the tank, it being understood that those that settle are in a perfect and ripe state, whereas those which float on the surface of the water are usually unfit for canning or treatments which serve to preserve them.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a plan view of a machine embodying the invention;

Figure 2 illustrates a longitudinal sectional view thereof;

Figure 3 illustrates a transverse sectional view thereof; and

Figure 4 illustrates an enlarged detail view of the conveyer.

In these drawings, 5 denotes a tank which is adapted to contain water, and while the water may be delivered to the tank in a heated state, the said tank may also be provided with means for heating the water, and therefore, a heating coil or pipe 6 is located in the tank and has circulating branches 7 and 8 for the passage of the heating agent such as steam or the like. As this feature of the invention may be changed to suit particular requirements as to the source of the heating agent, one skilled in the art will, it is thought, understand how the heating device may be installed without further description thereof.

Preferably, the tank has a hopper with the sides 9 and 10 converging toward the center, but they terminate in spaced relation to each other so that a clearance or opening is formed in the bottom of the hopper for the submerged berries to escape. Any suitable means may be provided for skimming the berries and the trash which floats on the water from the top of the hopper.

A fluid pump 11 has branches 12 and 13 extending into the tank for the purpose of causing the circulation of water to an extent that the berries will be agitated, a process which results in displacing the air bubbles which are on their outer surfaces.

A motor 14 has a connection 15 such as a sprocket chain with the pump for driving the said pump, and the said motor also operates a connection such as a chain 16 that operates the shaft 17 at one end of the conveyer, as will presently appear. As the particular type of power transmitting elements are immaterial as to detail, it is believed that the disclosure is sufficient to enable one skilled in the art to practice the invention without further illustration or description thereof.

The converging sides 9 and 10 of the tank support guides 18 and 19 for the traveling element 20 of the conveyer, the said traveling element, in the present embodiment of the invention, comprising a screened bottom the edges of which are anchored to flexible strips 21 and 22, which latter travel on the guides 18 and 19 and over pulleys 23 and 24, the former of which is on the shaft 17 and the latter of which is suitably mounted preferably at the bottom of the tank. The shaft 17, it will be seen, extends through the chute or spout 25, projecting from and communicating with the tank, and the conveyer travels from the tank through the said chute in carrying the berries from the tank.

Preferably, the conveying element 20 has curved blades 26 that serve to hold the berries as they are being carried from the tank, and when the motor is operated the water in the tank is agitated and the berries that have settled in the tank are removed by the operation of the conveyer.

I claim:

1. The method of collecting ripe berries from unripe berries and trash, consisting in subjecting the berries to an aqueous bath the temperature of which is approximately 115° F., in agitating the water to remove air from the exterior of the said berries, and in removing the ripe berries that have settled.

2. The method of separating ripe berries from unripe berries and trash, consisting in subjecting the berries and trash to an aqueous bath at a temperature of about 115° for the purpose of removing the air bubbles from the exterior surface of the berries.

3. The method of precipitating ripe berries in order to separate them from unripe berries and trash consisting in immersing the berries and trash into a warm liquid bath in order to remove the air bubbles from the exterior surface of the ripe berries.

4. In a device of the character described comprising an open top container of substantially uniform depth having an opening in the container wall located entirely below the level of the liquid therein contained, an inclined chute attached to the exterior of the container for extending the opening above the liquid level and a conveyor operating within the container and chute.

5. In a berry separating device, a liquid container having an opening in said container below the level of the liquid, a means for extending the opening above the liquid level and a portion of the container wall above the opening dividing the top of the container from the extended opening and preventing any material at the liquid level from passing to the extended opening.

6. A process for the separation from blueberries of dirt, dust, immature berries, insects and trash of such kinds as will float, consisting in subjecting blueberries to a water bath, the temperature of the water being maintained at approximately 125 degrees F. for a period of approximately fifteen minutes.

7. A process for the separation from blueberries of dirt, dust, immature berries, insects and trash of such kinds as will float, consisting in subjecting blueberries to a water bath, the temperature of the water being maintained above normal for a given length of time.

8. The method of separating ripe berries from foreign material, consisting in subjecting the berries and foreign material to a water bath, and simultaneously removing air and the foreign material from the berries.

9. A process for separating ripe berries from foreign material, consisting in subjecting the berries to a water bath, and maintaining the water above normal temperature for a given length of time.

10. The process of separating berries from foreign material which consists in subjecting them to the action of a fluid, agitating the berries while subjected to the action of said fluid, and separately removing the berries and foreign material.

JOSEPH W. SAWYER.